(12) United States Patent
Kim

(10) Patent No.: US 9,392,151 B2
(45) Date of Patent: Jul. 12, 2016

(54) DEVICE FOR PREVENTING CAMERA FROM BEING STOLEN

(71) Applicant: Kum Oh Electronics CO., LTD., Bucheon-si (KR)

(72) Inventor: Ki Sang Kim, Bucheon-si (KR)

(73) Assignee: KUM OH ELECTRONICS CO., LTD. (KR)

( * ) Notice: Subject to any disclaimer, the term of this patent is extended or adjusted under 35 U.S.C. 154(b) by 0 days.

(21) Appl. No.: 14/760,046

(22) PCT Filed: Dec. 23, 2013

(86) PCT No.: PCT/KR2013/011992
§ 371 (c)(1),
(2) Date: Jul. 9, 2015

(87) PCT Pub. No.: WO2014/109494
PCT Pub. Date: Jul. 17, 2014

(65) Prior Publication Data
US 2015/0365570 A1 Dec. 17, 2015

(30) Foreign Application Priority Data

Jan. 11, 2013 (KR) .................. 10-2013-0003500
Jan. 16, 2013 (KR) .................. 10-2013-0005086

(51) Int. Cl.
*H04N 5/225* (2006.01)
*G08B 13/14* (2006.01)
*H04N 9/31* (2006.01)

(52) U.S. Cl.
CPC .......... *H04N 5/2252* (2013.01); *G08B 13/1445* (2013.01); *H04N 5/2256* (2013.01); *H04N 9/3141* (2013.01)

(58) Field of Classification Search
CPC . H04N 5/2252; H04N 5/2254; H04N 5/2253; H04N 5/2251; H04N 5/2256; H04N 7/183; H04N 17/002; H04N 5/2171; H04N 1/00307
USPC .......................................... 348/143, 373–375
See application file for complete search history.

(56) References Cited

U.S. PATENT DOCUMENTS 7,082,264 B2 * 7/2006 Watanabe .............. G03B 15/05
396/177
7,293,648 B2 * 11/2007 Doran, Jr. .............. A45C 11/38
206/205

(Continued)

FOREIGN PATENT DOCUMENTS

JP 2004304466 10/2004
KR 1019940005164 3/1994

(Continued)

OTHER PUBLICATIONS

International Search Report—PCT/KR2013/011992 dated Mar. 31, 2014.

*Primary Examiner* — Hung Lam
(74) *Attorney, Agent, or Firm* — Cantor Colburn LLP

(57) ABSTRACT

A device for preventing a camera from being stolen, which covers the lens module separation button of the camera body so as to prevent the lens module from being separated from the body without permission. If a thief attempts to steal the camera by separating the cover or a mounting unit, or cutting or separating a cable from an alarm, the theft-prevention device generates an alarm or a flickering light to deter thieves and to notify the owner of the camera. The device for preventing a camera from being stolen includes: a cover for covering a lens module separation button enabling a lens module to be separated from a camera body; a mounting unit for mounting the cover to the camera body; and a sensor provided in the mounting unit for sensing a separation of the mounting unit.

1 Claim, 2 Drawing Sheets

(56) References Cited

U.S. PATENT DOCUMENTS

| | | | | |
|---|---|---|---|---|
| 9,264,588 B2 * | 2/2016 | Barthel | ............... | B60R 11/04 |
| 2008/0245452 A1 * | 10/2008 | Law | ............... | A45C 11/38 150/154 |
| 2008/0247750 A1 * | 10/2008 | Law | ............... | G03B 17/02 396/535 |
| 2013/0241731 A1 * | 9/2013 | Fawcett | ............... | G08B 13/1463 340/568.2 |
| 2014/0063238 A1 * | 3/2014 | Abdollahzadeh | ....... | A47F 7/024 348/143 |

FOREIGN PATENT DOCUMENTS

| | | |
|---|---|---|
| KR | 1020060082999 | 7/2006 |
| KR | 1020080079416 | 9/2008 |
| KR | 1020080082999 | 9/2008 |
| KR | 1020080095994 | 10/2008 |
| KR | 101196832 | 11/2012 |

* cited by examiner

DEVICE FOR PREVENTING CAMERA FROM BEING STOLEN

TECHNICAL FIELD

The present invention generally relates to a device for preventing an expensive electronic camera from being stolen. More particularly, the present invention relates to a device for preventing a camera from being stolen, which covers a lens module separation button of a camera body so as to prevent a lens module from being separated from the camera body without permission, and, if a thief attempts to steal the camera by separating the cover or a mounting unit, or cuts or separates a cable from an alarm, the device generates an alarm sound or a flickering light to deter the thief and to notify the owner of the attempted theft.

BACKGROUND ART

Among various electronic goods, cameras are small-sized and high-priced goods, so the cameras are frequently targeted by thieves.

Particularly, cameras for professionals are very expensive goods that cost several thousand dollars or several tens of thousand dollars, and lens modules for such expensive cameras also cost several thousand dollars.

A store manager who sells these expensive cameras while exhibiting them should pay careful attention to his inventory so as to prevent the cameras from being stolen or lost when there are persons around the exhibited merchandise.

However, a manager may be distracted, so a thief may seize the opportunity to steal an expensive camera.

Accordingly, although it is required to provide a device for preventing such expensive cameras for professionals from being stolen or lost, an effective device for preventing an expensive camera for professionals from being stolen or lost has not been proposed or used in the related art.

However, a device for preventing middle- or low-priced cameras for non-professionals from being stolen or lost has been proposed in the related art. For example, Korean Patent Application Publication No. 2008-0082999 discloses "an image processing device having a function of preventing a camera from being stolen or lost".

The image processing device having the function of preventing the camera from being stolen or lost disclosed in Korean Patent Application Publication No. 2008-0082999 was proposed according to the recent rapid development of information communication technologies, wherein the image processing device including an alarm was adopted to receive a frequency signal transmitted from an oscillator, embedded in the camera, oscillating at a predetermined frequency, and to generate an alarm sound when the camera deviates from a place by a predetermined distance to the extent that a frequency signal is not received.

As another related art relating to a device for preventing a camera from being stolen or lost, Korean Patent Application Publication No. 2008-0079416 discloses "a distance detection method using response time between Bluetooth devices, a method of preventing loss using the same, and a portable terminal using the same".

"The distance detection method using response time between Bluetooth devices, the method of preventing loss using the same, and the portable terminal using the same" disclosed in Korean Patent Application Publication No. 2008-0079416 are provided to detect the deterioration of Bluetooth communication quality or the disconnection of Bluetooth communication using a local area network between terminal products having a Bluetooth function when the terminal deviates from a predetermined distance due to its theft or loss, and to detect a distance between the two terminals based on detected information, thereby enabling an alarm sound to be generated when the terminal is determined to be stolen or lost.

In both Korean Patent Application Publication No. 2008-0082999 "the image processing device having the function of preventing the camera from being stolen or lost" and Korean Patent Application Publication No. 2008-0079416 "The distance detection method using response time between Bluetooth devices, the method of preventing loss using the same, and the portable terminal using the same", local area communication technologies were used.

In order for a local area communication technology to be applied to an expensive camera, a wireless communication module for enabling wireless communication should be separately mounted to the camera, and an alarm in which another wireless communication module for wirelessly performing transmission and reception with the wireless communication module mounted to the camera is embedded should be provided.

A wireless communication module is somewhat expensive, the wireless communication module may be malfunctioned or may not be operated, and a wireless signal transmitted or received from the wireless communication module may cause interference with an electrical signal upon use of the camera for photographing. Above all, when the camera deviates from the alarm by a distance of several meters or several tens of meters, since the alarm generates an alarm sound by detecting theft or loss of the camera, it is problematic in that it is not easy to regain the stolen camera by pursuing a thief on the run at that time.

In order to solve the problems occurring in the related arts, the present applicant suggested Korean Patent No. 1196832 "a device for preventing a camera from being stolen".

The granted patent owned by the present applicant is problematic in that a screw thread should be additionally processed on an inner circumference of a lens module in order to mount a mounting unit detecting camera theft so that costs are increased, and a mounting space should be secured at the inner circumference in a housing, and in that a cable connected to the mounting unit causes inconvenience by slightly impeding use of the camera.

DISCLOSURE

Technical Problem

The present invention is an invention resulting from improving Korean Patent No. 1196832 "the device for preventing a camera from being stolen" suggested by the present applicant in order to solve the problems occurring in the related arts that do not have a special means for preventing expensive cameras from being stolen or lost, and in which wireless communication modules as devices for preventing cameras from being stolen or lost applied to a popular camera, such as a digital camera, according to the development of information communication technologies are used.

An object of the present invention is to provide a device for preventing a camera from being stolen, which can be conveniently mounted to the camera without performing additional separate processing for the camera, and which can minimally reduce inconvenience caused by a cable upon using the camera.

Technical Solution

In order to achieve the above object, according to one aspect of the present invention, there is provided a device for preventing a camera from being stolen, the device including:

a cover for covering a lens module separation button enabling a lens module to be separated from a camera body;

a mounting unit for mounting the cover to the camera body; and a sensor provided in the mounting unit for sensing a separation of the mounting unit.

The mounting unit may be provided with a locking pin that is locked to a tripod locking part of the camera body.

The cover includes:

a hiding part covering and hiding the lens module separation button;

a covering part integrated with the hiding part and covering a lower surface of the camera body; and a through hole provided in the covering part at a location corresponding to a tripod locking part provided on the lower surface the camera body, and the mounting unit includes:

a housing provided with the sensor on an inner surface thereof so that the sensor is brought into pressure contact with the covering part;

a locking pin locked to the tripod locking part after passing through the through hole; and a longitudinal hole provided in the housing and allowing a pin part of the locking pin to pass therethrough while catching a head of the locking pin.

Advantageous Effects

According to the present invention having the above-described characteristics, a device for preventing a camera from being stolen can efficiently prevent the camera from being stolen by enabling an alarm to generate an alarm sound or a flickering light immediately when a thief attempts to steal the camera by separating a mounting unit from the camera with malicious intent by cutting a cable, separating the cable from the alarm by pulling the cable, or the like, so that the thief will be dissuaded from stealing the camera, a manger of the camera will have his/her attention drawn to the camera, and the camera can be recovered by pursuing the thief immediately upon theft of the camera.

The device for preventing the camera from being stolen according to the present invention is mounted to the camera via a tripod locking part provided in the camera for installing a tripod and is not required to be separately processed so as to be mounted to the camera, so labor and costs resulting from separate processing for mounting the device are not needed, and there is no damage to the camera resulting from separate processing. Furthermore, since the device for preventing the camera from being stolen is simply mounted to and separated from the tripod locking part for installing a tripod via the locking pin and is configured such that a cable connected to the alarm is disposed to the side of a camera body rather than the side of a lens module so that inconvenience caused by the cable upon using the camera can be reduced, the device for preventing the camera from being stolen is a very useful invention for industrial development.

Figure 1:
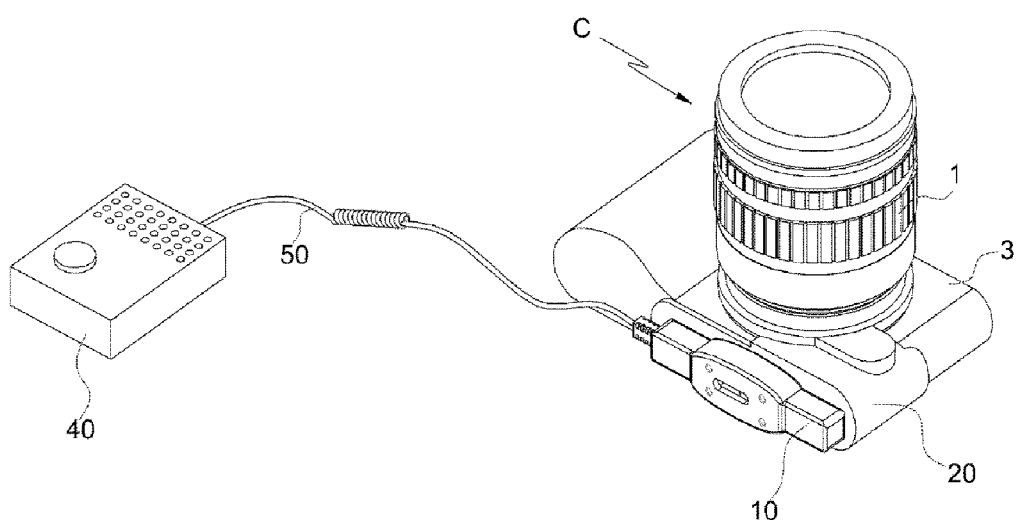
FIG. 1 is a perspective view showing an example of the use of a device for preventing a camera from being stolen according to the present invention that is mounted to a camera.
Figure 2:
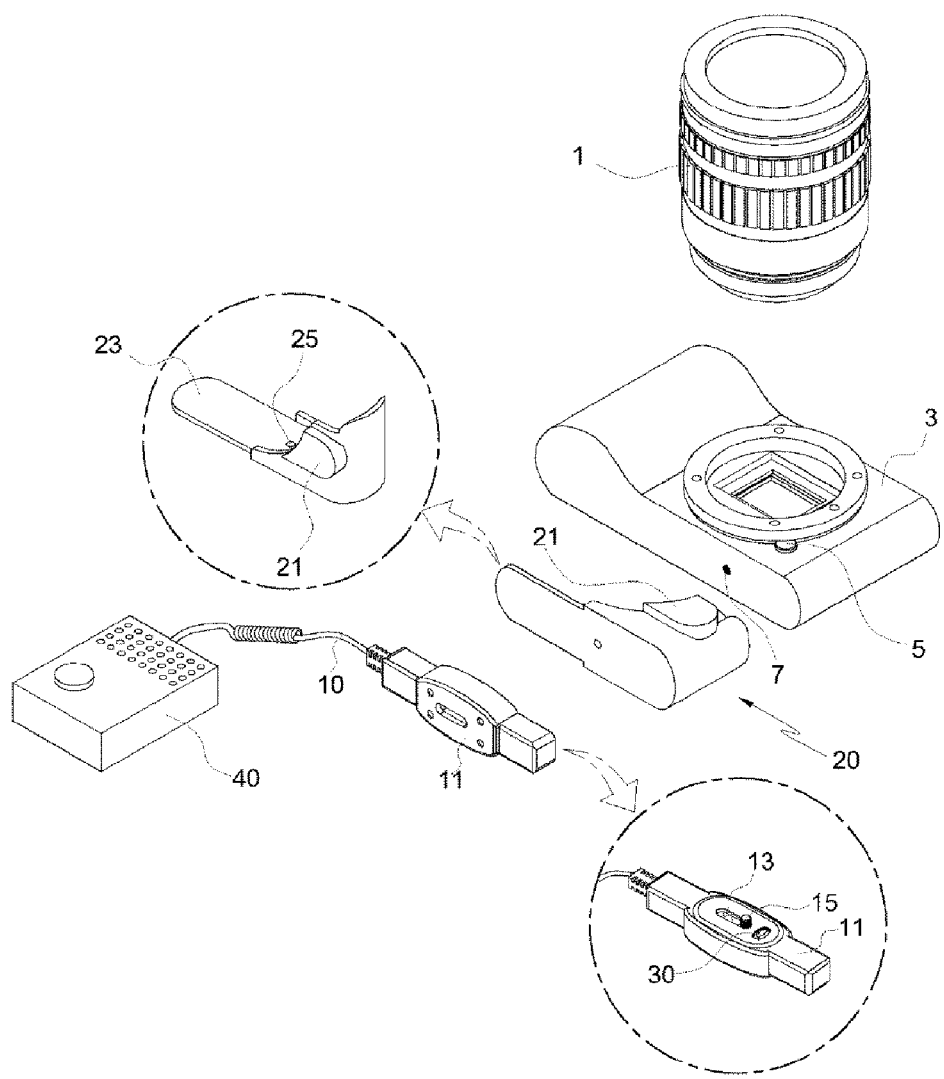
FIG. 2 is an exploded perspective view of FIG. 1.

<Description of the Reference Numerals in the Drawings>

| C: camera | 1: lens module |
|---|---|
| 3: camera body | |
| 5: lens module separation button | |
| 7: tripod locking part | 10: mounting unit |
| 11: housing | 15: locking pin |
| 20: cover | 21: hiding part |
| 23: covering part | 30: sensor |
| 40: alarm | 50: cable |

MODE FOR INVENTION

A device for preventing a camera from being stolen according to the present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Hereinbelow, a device for preventing a camera from being stolen according to the present invention will be described in detail with reference to the accompanying drawings.

As shown in the drawings, the device for preventing the camera from being stolen according to the present invention includes a mounting unit 10, a cover 20, a sensor 30, and an alarm 40.

A camera C includes: a camera body 3; a lens module 1 coupled to the front of the camera body; a lens module separation button 5 provided in the camera body 3 and adopted to enable the lens module 1 to be separated from the camera body 3; and a tripod locking part 7 provided on a lower surface of the camera body 3 and adopted to install a tripod.

Recently, cameras tend to have the lens module separation button 5 in order to prevent the expensive lens module 1 from being unintentionally separated from the camera body 3. The lens module 1 may be coupled to or released from the camera body only in a state where the lens module separation button 5 is pushed, but the lens module 1 may not be coupled to or released from the camera in a state where the lens module separation button 5 is not pushed.

Based on the fact that recent cameras have the lens module separation button 5 intended for separating the lens module 1 from each camera, the present invention is configured such that the lens module separation button 5 is covered by a cover 20 so that an unauthorized person cannot push the lens module separation button 5, thereby preventing the unauthorized person from separating the expensive lens module 1 from the camera body 3 and stealing it, and the sensor 30 is arranged at the mounting unit for mounting the cover 20 so that an alarm sound can be generated via an alarm 40 when an unauthorized person attempts to separate the mounting unit 10 and the cover 20 from the camera, attempts to take the camera in a state where the device for preventing the camera C from being stolen according to the present invention is mounted to the camera, or attempts to cut a cable 50 connected to the alarm 40 in order to steal the camera C, thereby preventing the camera from being stolen.

The cover 20 includes:

a hiding part 21 covering and hiding the lens module separation button 5 of the camera body 3, namely, preventing an unauthorized person from approaching to the lens module separation button 5;

a covering part 23 integrated with the hiding part 21 and covering a lower surface of the camera body 3; and a through hole 25 formed to pass through the covering part 23 and disposed at a location corresponding to the tripod locking part 7 provided on the lower surface of the camera body 3 and intended for installing the tripod The mounting unit 10 is intended for mounting the cover 20 to the camera body 3.

The mounting unit 10 includes:

a housing 11;

a locking pin 15 locked to the housing, and locked to the tripod locking part 7 of the camera body 3 after passing through the through hole 25 of the cover 20; and a longitudinal hole 13 provided in the housing 11 and allowing a pin part of the locking pin to pass therethrough while catching a head of the locking pin 15.

A screw thread is formed in the pin part of the locking pin 15 so that the pin part can be screw-connected to the tripod locking part 7, and the longitudinal hole 13 enables the locking pin 15 to be movable within a predetermined range so that the pin part of the locking pin 15 can more easily pass through the through hole 15 and can be locked to the tripod locking part 7.

The sensor 30 is a pressing sensor for sensing the presence or absence of pressure contact and is provided on an inner surface of the housing 11 of the mounting unit 10. Thus, when the locking pin 15 is locked to the tripod locking part 7 to tighten the housing 11 to a side of the cover 20, the sensor is brought into pressure contact with a covering part 23 of the cover 20, and when tightening of the locking pin 15 is released, and thus pressure of the contact becomes lower, the sensor senses it.

The sensor 30 is electrically connected to the alarm 40 via the cable 50.

The sensor 30 constitutes the alarm 40 and a closed circuit via the cable 50 in a state of being brought into pressure contact with the cover 2, and accordingly, the sensor is electrically connected to the alarm 40. When pressure contact of a pressing tip 33 is released, as the closed circuit becomes an open circuit, the electrical connection of the sensor and the alarm 40 is blocked Accordingly, in a state where the mounting unit 10 is coupled to the tripod locking part 7 of the camera body 3 via the locking pin 15, the alarm 40 determines such a state as a normal state without problem in which the alarm 40 and the sensor 30 are electrically connected to each other.

However, when pressure is released, and the closed circuit becomes an open circuit as the mounting unit 10 is separated from the tripod locking part 7 of the camera body 3, when the closed circuit becomes an open circuit as the cable 50 is cut, or when the closed circuit becomes an open circuit as the cable 50 is pulled to be separated from the alarm 40, the electrical connection of the alarm 40 and the sensor 30 is blocked, and as a result, the alarm determines such a state as an abnormal state, thereby generating an alarm sound or a flickering light to notify of an attempt to steal the camera C.

The alarm 40 is a device for notifying of an attempted theft of the camera C using an alarm sound via a speaker or a flickering light using a lamp by receiving a sensing signal from the sensor 30. As previously described, the alarm constitutes the sensor 30 and the closed circuit via the cable 50, and generates an alarm sound or a flickering light when the closed circuit is changed to the open circuit due to an attempt to steal the camera.

The alarm 40 may be large- or middle-sized to the extent that a thief cannot take the alarm with the camera, or may be small-sized to have a light weight so that a manager of the camera C can hang the alarm around his or her neck in a necklace form or can use the alarm in a state of being put it into his or her pocket.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A device for preventing a camera from being stolen, the device comprising:

a cover for covering a lens module separation button enabling a lens module to be separated from a camera body;

a mounting unit for mounting the cover to the camera body; and a sensor provided in the mounting unit for sensing a separation of the mounting unit, wherein the cover includes:

a hiding part covering and hiding the lens module separation button;

a covering part integrated with the hiding part and covering a lower surface of the camera body; and a through hole provided in the covering part at a location corresponding to a tripod locking part provided on the lower surface the camera body, and wherein the mounting unit includes:

a housing provided with the sensor: and a locking pin locked to the tripod locking part after passing through the through hole;

wherein the sensor is provided on an inner surface of the housing and is brought into pressure contact with the covering part, and wherein the cover further includes: a longitudinal hole provided in the housing and allowing a pin part of the locking pin to pass therethrough while catching a head of the locking pin.

* * * * *